(12) United States Patent
Blomstedt et al.

(10) Patent No.: US 12,032,182 B2
(45) Date of Patent: Jul. 9, 2024

(54) DIFFRACTIVE GRATING

(71) Applicant: DISPELIX OY, Espoo (FI)

(72) Inventors: Kasimir Blomstedt, Espoo (FI); Jussi Rahomäki, Espoo (FI); Ismo Vartiainen, Espoo (FI)

(73) Assignee: DISPELIX OY, Espoo (FI)

( * ) Notice: Subject to any disclaimer, the term of this patent is extended or adjusted under 35 U.S.C. 154(b) by 932 days.

(21) Appl. No.: 17/041,308

(22) PCT Filed: Feb. 25, 2019

(86) PCT No.: PCT/FI2019/050149
§ 371 (c)(1),
(2) Date: Sep. 24, 2020

(87) PCT Pub. No.: WO2019/185975
PCT Pub. Date: Oct. 3, 2019

(65) Prior Publication Data
US 2021/0080628 A1    Mar. 18, 2021

(30) Foreign Application Priority Data

Mar. 28, 2018  (FI) ..................................... 20185294

(51) Int. Cl.
*G02B 5/18*    (2006.01)
*G02B 27/01*   (2006.01)
*G02B 27/42*   (2006.01)

(52) U.S. Cl.
CPC ......... *G02B 5/1814* (2013.01); *G02B 5/1823* (2013.01); *G02B 5/1847* (2013.01); *G02B 27/0172* (2013.01); *G02B 27/4294* (2013.01)

(58) Field of Classification Search
CPC .. G02B 5/1814; G02B 5/1823; G02B 5/1847; G02B 27/0172; G02B 27/4294;
(Continued)

(56) References Cited

U.S. PATENT DOCUMENTS

| 3,623,797 A | 11/1971 | Daw |
| 4,729,640 A | 3/1988 | Sakata |

(Continued)

FOREIGN PATENT DOCUMENTS

| CN | 1487310 A | 4/2004 |
| CN | 1758819 A | 4/2006 |

(Continued)

OTHER PUBLICATIONS

Finnish Search Report dated Oct. 17, 2018 as received in application No. 20185294.
(Continued)

*Primary Examiner* — George G. King
(74) *Attorney, Agent, or Firm* — Maschoff Brennan

(57) ABSTRACT

The invention relates to a selective diffractive grating and applications thereof. The grating comprised in a periodic alternating pattern first material having a first dispersion curve ($n_1$), and second material having a second dispersion curve ($n_2$) different from the first dispersion curve ($n_1$). According to the invention, the first and second dispersion curves (n–i, n 2) intersect each other at two or more different wavelengths ($\lambda_1$ $\lambda_2$).

15 Claims, 2 Drawing Sheets

(58) Field of Classification Search
CPC .... G02B 5/203; G02B 6/0043; G02B 6/0076; G02B 2027/0112; G02B 2027/0114; G02B 2027/0174; G02B 27/1086; G02B 27/4272; G02B 27/1006; G02B 5/1861; G02B 5/1871; G02B 6/34; G02B 27/0101
See application file for complete search history.

(56) References Cited

U.S. PATENT DOCUMENTS

| | | |
|---|---|---|
| 7,031,078 B2 | 4/2006 | Ukuda |
| 9,988,517 B2 | 6/2018 | Chen et al. |
| 2004/0004767 A1 | 1/2004 | Song |
| 2007/0298533 A1 | 12/2007 | Yang et al. |
| 2008/0310024 A1 | 12/2008 | Sato et al. |
| 2008/0316600 A1 | 12/2008 | Koyanagi et al. |
| 2016/0216416 A1* | 7/2016 | Tekolste ............ G02B 27/0172 |
| 2017/0010466 A1 | 1/2017 | Klug et al. |

FOREIGN PATENT DOCUMENTS

| | | | |
|---|---|---|---|
| CN | 1777937 A | 5/2006 | |
| CN | 101231357 A | 7/2008 | |
| CN | 104364272 A | 2/2015 | |
| EP | 2 733 517 A1 | 5/2014 | |
| JP | H01205106 A * | 8/1989 | .......... G02B 6/1245 |
| JP | 2003-329968 A | 11/2003 | |
| JP | 2006-085756 A | 3/2006 | |
| JP | 2008-058777 A | 3/2008 | |
| JP | 2009-186794 A | 8/2009 | |
| JP | 2012-208506 A | 10/2012 | |
| JP | 2012243378 A | 12/2012 | |
| JP | 2014-132328 A | 7/2014 | |
| JP | 2014-224846 A | 12/2014 | |
| WO | 2017196999 A1 | 11/2017 | |
| WO | 2018/014467 A1 | 1/2018 | |

OTHER PUBLICATIONS

Chinese Office Action dated Aug. 31, 2021 as received in application No. 201980010969.8.
Extended European Search Report dated Aug. 16, 2021 as received in Application No. 19774459.2.

* cited by examiner

DIFFRACTIVE GRATING

FIELD OF THE INVENTION

The invention relates to diffractive optics. In particular, the invention relates to gratings that can be used to couple light into waveguides used in diffractive display elements and devices. The invention can be used in personal display devices, such as head-mounted displays (HMDs) and head-up displays (HUDs). Such displays typically comprise a waveguide and at least one grating arranged onto or into the waveguide.

BACKGROUND OF THE INVENTION

Waveguides are key image-forming elements in many modern personal display devices. The image to be displayed can be coupled into and out of the waveguide, as well as modified within the waveguide, using diffractive gratings arranged in the main plane of the waveguide, typically on its surface. For example, there may be provided an in-coupling grating for coupling an image from a projector into the waveguide, an exit pupil expander grating for expanding the light field in one or more in-plane dimensions of the waveguide, and an out-coupling grating which couples the light field out of the waveguide to the user's eye.

Waveguides can be arranged as stacks whose layers carry different wavelengths, in order to provide multicolor displays. One aim in in- and out-coupling arrangements of such stacks is to make complete wavelength separation between the layers. However, in practice at least part of rays intended to one layer is coupled to another layer. There is a need for improved solutions for this purpose, for example and for other applications where good control of wavelengths is needed.

SUMMARY OF THE INVENTION

It is an aim of the invention to provide a novel solution for improving control of wavelengths in particular in waveguide-based display applications.

A particular aim is to provide novel solution for improving color separation in in- and/or out-coupling arrangements of multicolor waveguides, waveguide stacks and display devices.

The aims are achieved by the invention as defined in the independent claims.

In one aspect, the invention provides a selective diffractive grating comprising a periodic alternating pattern of first material having a first dispersion curve, and second material having a second dispersion curve different from the first dispersion curve. The first and second dispersion curves intersect each other at two or more different wavelengths, thus making the grating fully transparent at these wavelengths. These wavelengths can be called intersection wavelengths.

In one aspect, the invention provides a waveguide comprising a grating of the abovementioned kind. The grating can be an in-coupling or out-coupling grating, for example. In one embodiment, there is provided a stack of gratings each adapted to be transparent for two of the wavelengths and 'visible' for one of the wavelengths, respectively, using the principle herein disclosed.

In one aspect, the invention provides a waveguide stack having multiple layers, at least one of which is a waveguide of the above kind. Typically, each of the layers comprises an in-coupling and/or out-coupling grating which as aligned with each other. Placing the inventive grating on the topmost waveguide layer, for example, allows for two wavelengths corresponding to the intersection wavelengths to pass the topmost layer without interacting therewith and to couple a third wavelength in the topmost layer.

The present method of manufacturing a selectively transparent diffractive grating, comprising
  selecting two or more different wavelengths,
  selecting a diffractive pattern configuration utilizing at least two different materials,
  selecting at least two different solid materials having different dispersion curves, which intersect each other at said two or more different wavelengths,
  manufacturing the grating using said diffractive pattern configuration and said different solid materials therein.

The invention offers significant benefits.

The two intersection wavelengths give full control of colors in three-color display waveguide elements implemented with a single waveguide or using stack of waveguides in which each layer is intended to carry one color only. One can set the intersection wavelengths such that only one of the used wavelengths interacts with the grating and modifies the light field in the waveguide. The two other wavelengths continue through the grating and the waveguide without interaction.

Specifically, with the present completely wavelength-independent control it is possible to use only one waveguide and still achieve the same wavelength-separation for three colors as with three separate monochromatic waveguides.

The invention suits particularly well to be used with RGB laser image projector having narrow wavelength bands.

The dependent claims are directed to selected embodiments of the invention.

Next, embodiments of the invention and advantages thereof are discussed in more detail with reference to the attached drawings.

DETAILED DESCRIPTION OF EMBODIMENTS

Figure 1:
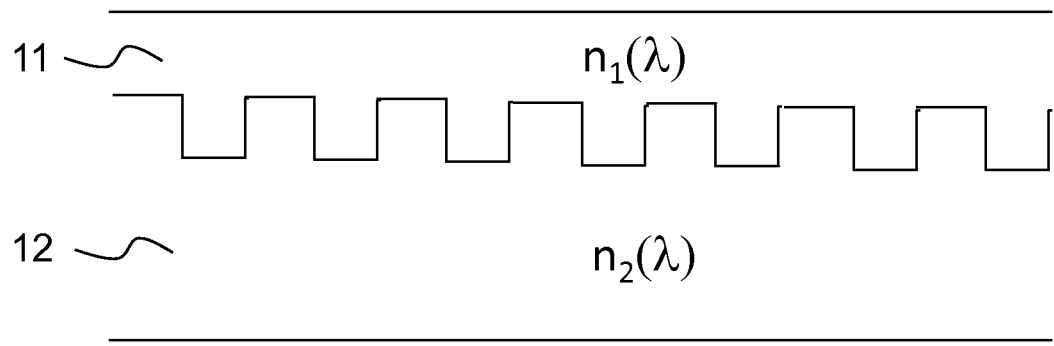
FIG. 1 shows a cross-sectional view of a grating according to one embodiment.

FIG. 1 shows a grating made of two layers of different materials. The first layer 11 has a first wavelength-dependent index of refraction $n_1$ and the second layer 12 has a second wavelength-dependent index of refraction $n_2$. At the interface of the layers, the materials are interleaved so as to form a periodic diffractive structure, i.e. a grating.

The indices of refraction $n_1$ and $n_2$ define dispersion curves, which are adapted to intersect at two or more distinct wavelengths, for which the grating is non-diffractive, i.e. fully transparent. For other wavelengths, the grating is diffractive (i.e. diffracts into non-zero transmission or reflection order, such as the +/−1st order). Thus, a diffractive grating having two passbands is achieved.

Figure 2:
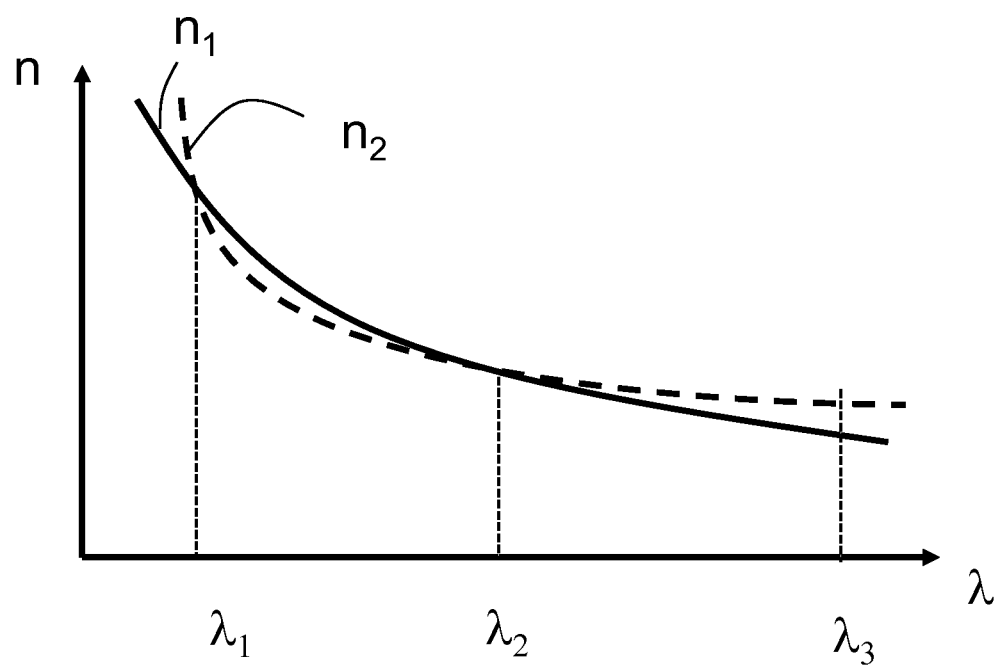
FIG. 2 shows an exemplary graph of suitable dispersion curves of two different materials.

An exemplary dispersion curve graph is shown in FIG. 2, showing curves $n_1$ and $n_2$ of the different materials. Here, wavelengths $\lambda_1$ and $\lambda_2$ correspond to the intersection wavelengths, whereas at the wavelength $\lambda_3$ the indices of refraction are significantly different. FIG. 2 illustrates a beneficial situation where the dispersion curves have suitably different "curvatures" so that they intersect twice at the visible wavelength range.

In one example, at least one of the materials is silicon nitride, in particular amorphous hydrogenated silicon nitride ($SiN_x$). Its stoichiometry x can be tuned so as to make it suitable for the present use. Similar effect can be achieved with other materials, too, some of which are discussed below.

In one example, at least one of the materials is titanium dioxide ($TiO_2$), hafnium dioxide ($HfO_2$) or zirkonium dioxide ($ZrO_2$) as such or as mixed oxides in various stoichiometric forms. These can be used with one another in suitable stoichiometry and, in particular, as co-materials with $SiN_x$ to achieve the present grating.

In specific examples, the grating is formed of one of the following material pairs: SiNx-TiO2, SiNx-HfO2 or SiNx-ZrO2.

It is also possible that the different materials have the same elementary components but have stoichiometries adjusted so as to give the materials the different dispersion curves.

The tuning of $SiN_x$ dispersion curves and production of $SiN_x$ materials suitable for the present use are discussed for example in Charifi, H., Slaoui, A., Stoquert, J. P., Chaib, H. and Hannour, A. (2016) Opto-Structural Properties of Silicon Nitride Thin Films Deposited by ECR-PECVD. *World Journal of Condensed Matter Physics*, 6, 7-16 (http://dx.doi.org/10.4236/wjcmp.2016.61002).

Tuning of $TiO_2$ and $HfO_2$ mixed oxide dispersion curves is discussed e.g. by Mazur M., et al, Influence of Material Composition on Structural and Optical Properties of HfO2-TiO2 Mixed Oxide Coatings, Coatings 2016, 6, 13.

Tuning of $TiO_2$ dispersion curves is discussed in Huang Y., et al, Characterization of low temperature deposited atomic layer deposition $TiO_2$ for MEMS applications, J. Vac. Sci. Technol. A, Vol. 31, No. 1, January/February 2013.

Tuning of $ZrO_2$ dispersion curves in discussed in Dang V-S. et al, Investigation of Optical, Electrical, and Mechanical Properties of MOCVD-grown ZrO2 Films, Chem. Vap. Deposition 2014, 20, 320-327.

In typical examples, the different wavelengths are in the visible wavelength range, preferably separated by at least 50 nm. This makes the grating and waveguide containing the grating suitable for display applications.

Typically, the present grating is arranged on one or both of the main surfaces of a waveguide or within a waveguide.

The present diffractive waveguide stack comprises at least two superimposed waveguide layers, at least one of which comprises a waveguide as discussed herein. This means that the grating is optically connected to the waveguide so that at least at some other wavelengths than the wavelengths at which the dispersion curves intersect, the grating is capable of coupling light into the waveguide and/or interacting with the light field of the waveguide some other way.

Figure 3:
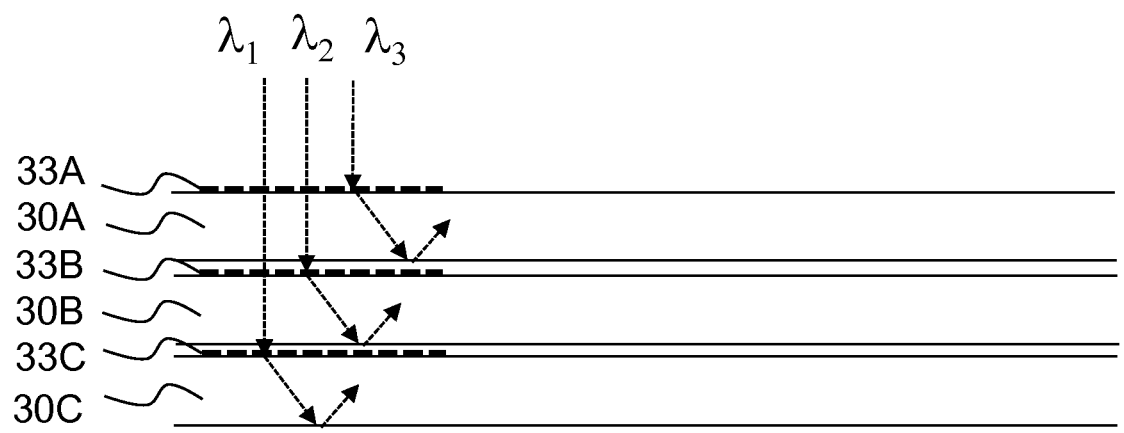
FIG. 3 shows a waveguide stack taking advantage of the invention according to one embodiment.

FIG. 3 shows an exemplary stack comprising three waveguide layers 30A-C, each of which has an in-coupling grating 33A-C, respectively, arranged thereon. The grating 33A of the topmost layer 30A is of the kind discussed here. Thus, it allows rays at wavelengths $\lambda_1$ and $\lambda_2$ to pass through the layer 30A unobstructed, but couples rays at wavelength $\lambda_1$ into the layer 30A. The next layer 30B and grating 33B are configured to pass wavelength $\lambda_1$ to layer 30C and to couple wavelength $\lambda_2$ to the layer 30B. Finally, the last grating 33C couples wavelengths $\lambda_1$ into the last layer 30C.

In some embodiments, the second and/or third gratings are also gratings according to the present invention, however having differently tuned transmission wavelengths, for preventing coupling of rays having adversely passed the upper layers to couple into the lower layers.

There may also be filters (not shown) can be used between the layers to prevent incompletely coupled rays to couple to the next layers.

Instead of in addition to an in-coupler discussed in detail above, a similar arrangement can be used in an out-coupler or exit pupil expander of the waveguide element.

Instead of using a waveguide stack and "physical monochomatization", color separation can be achieved using a single waveguide layer and "virtual monochromatization", as described below with the aid of an example.

Figure 4:
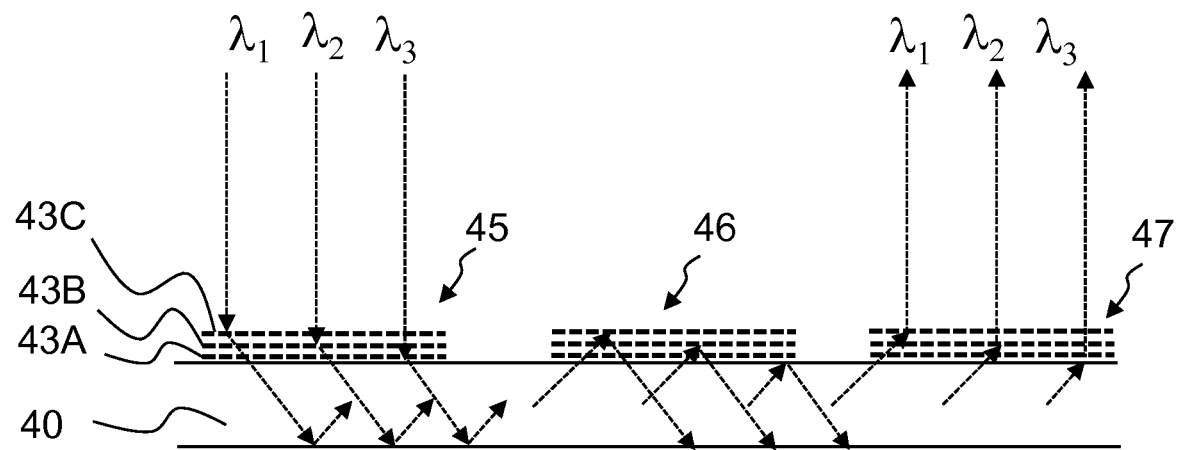
FIG. 4 shows a single-layer waveguide taking advantage of the invention according to one embodiment.

FIG. 4 shows an exemplary single waveguide 40 comprising an in-coupler 45 having three in-coupling gratings 43A-C, respectively, arranged thereon as a grating stack. The gratings 43A-C are configured suitably in accordance with the invention so that each grating is transparent to two of the three wavelengths $\lambda_1, \lambda_2, \lambda_3$ used and is therefore only visible to, i.e. diffracts, the third wavelength. The gratings 43A-C are all different with respect to each other so that all wavelengths will be coupled to the waveguide 40. This way, a single physical waveguide 40 may guide all wavelengths necessary to produce a multicolor image but appears virtually as three monochromatic waveguides, where the different wavelengths can be controlled separately.

This embodiment gives better control of light rays inside a single waveguide than is possible with gratings designed to work for all wavelengths simultaneously.

The periods of the gratings can be chosen relatively freely, for example such that for each wavelength used, the diffraction angle is the same. Thus, the stack of gratings can be effectively achromatic.

Instead of in addition to an in-coupler 45 discussed in detail above, a similar grating stack can be used as an exit pupil expander (EPE) 46 and/or as an out-coupler 47. This way, the control of colors remains throughout the waveguide.

In one embodiment the intersection wavelengths of the stack of gratings is adapted so that each grating has one intersection wavelength common with one intersection wavelength other grating of the stack.

The three wavelengths used are typically selected in the blue, green and red visible wavelength ranges.

The present personal display device comprises a waveguide or waveguide stack of the above kind, serving as the display element of the device. In addition, there is a projector for projecting an image into the waveguide or waveguide stack at least partly through and with the aid of the grating. The projector is a multicolor projector adapted to emit light rays at least at three different wavelengths, two of which correspond to said different wavelengths to which the grating is transparent. In the case of several gratings in accordance with the invention, the intersection wavelengths of the gratings can be suitably permuted with the three wavelengths of the projector.

Preferably, the projector is a three-color laser projector. The intersection wavelengths are set to correspond to two of the three colors, whereas at the wavelength of the third color, the indices of refraction of the two different materials differ sufficiently so as to cause significant diffraction. At that wavelength, the indices may differ for example by 0.05 units or more, in particular by 0.1 units or more, for achieving a decent diffraction efficiency.

Although herein described in the context of in-coupling, the grating finds uses also in out-coupling arrangements and exit pupil expander arrangements.

In some applications it may be beneficial to use gratings with singly intersecting dispersion curve gratings together with one or more doubly intersecting dispersion curve gratings disclosed herein.

The grating may be a linear grating with periodicity in one direction only or a two-dimensional grating with periodicity in two dimensions.

It should be noted that the grating may form a separate entity on or within the waveguide or one of the grating materials may be unitary with the waveguide. Moreover, although illustrated in FIG. 1 also as a binary grating, the grating features may take any desired profile, such as a blazed profile. Gratings of the present kind may be used as parts of larger diffractive optical elements.

In one embodiment of the present method the different dispersion curves are provided by
selecting elementary components of the first material,
selecting elementary components of the second material,
selecting stoichiometries of the first and/or second materials so that their dispersion curves intersect at two or more different wavelengths,
selecting a production methods yielding said stoichiometries,
producing said materials with said production methods and stoichiometries into an alternating pattern of said different materials for forming the grating.

CITATIONS LIST

Non-Patent Literature

Charifi, H., Slaoui, A., Stoquert, J. P., Chaib, H. and Hannour, A. (2016) Opto-Structural Properties of Silicon Nitride Thin Films Deposited by ECR-PECVD. *World Journal of Condensed Matter Physics*, 6, 7-16.

Mazur M., et al, Influence of Material Composition on Structural and Optical Properties of HfO2-TiO2 Mixed Oxide Coatings, Coatings 2016, 6, 13

Huang Y., et al, Characterization of low temperature deposited atomic layer deposition $TiO_2$ for MEMS applications, J. Vac. Sci. Technol. A, Vol. 31, No. 1, January/February 2013.

Dang V-S. et al, Investigation of Optical, Electrical, and Mechanical Properties of MOCVD-grown ZrO2 Films, Chem. Vap. Deposition 2014, 20, 320-327.

The invention claimed is:

1. A two-dimensional waveguide comprising:
a stack of diffractive gratings, at least one of the diffractive gratings being arranged on a surface or within a waveguide, each diffractive grating comprising in a periodic alternating pattern formed into:
a first material having a first refractive index defining a first dispersion curve,
a second material having a second refractive index defining a second dispersion curve different from the first dispersion curve, wherein
said first and second dispersion curves intersect each other at two or more different intersection wavelengths, wherein each intersection wavelength is for a wavelength for which said first material and second material have the same refractive index,
wherein at least one of the intersection wavelengths of each grating are different from each other,
wherein the intersection wavelengths of the stack of gratings are adapted so that each grating has one intersection wavelength in common with one intersection wavelength of each other grating of the stack.

2. The waveguide according to claim 1, wherein said different wavelengths are within the wavelength range of 380-750 nm, separated by at least 50 nm.

3. The waveguide according to claim 1, wherein at least one of said materials is SiNX.

4. The waveguide according to claim 3, wherein at least one of said materials is $TiO_2$, $HfO_2$ or $ZrO_2$.

5. The waveguide according to claim 1, wherein the dispersion curves differ at least at some wavelength within the range of 380-750 nm by at least 0.05.

6. The waveguide according to claim 1, wherein the grating is arranged on a major surface of the waveguide.

7. The waveguide according to claim 1, wherein the stack of gratings is capable of being: an in-coupler of the waveguide, an exit pupil expander of the waveguide, and/or an out-coupler of the waveguide.

8. The waveguide according to claim 1, wherein the stack of gratings is capable of being an in-coupler of the waveguide.

9. The waveguide according to claim 1, wherein the stack of gratings is capable of being an exit pupil expander of the waveguide.

10. The waveguide according to claim 1, wherein the stack of gratings is capable of being an out-coupler of the waveguide.

11. The waveguide according to claim 1, wherein the dispersion curves differ at least at some wavelength within the range of 380-750 nm by at least 0.1.

12. A personal display device, comprising
a waveguide serving as a see-through display element, wherein each waveguide comprises the waveguide of claim 1; and
a projector for projecting an image into the waveguide at least partly through and with the aid of said stack of gratings in the waveguide,
wherein the projector is a multicolor projector adapted to emit light rays at least at three different wavelengths, two of which correspond to said different intersection wavelengths of the grating or gratings in the waveguide.

13. The personal display device according to claim 12, wherein the projector is a laser projector.

14. The personal display device according to claim 12, comprising at least three such gratings arranged as a stack of gratings on a single waveguide, the intersection wavelengths of the gratings being permuted with the wavelengths emitted by the projector.

15. The personal display device according to claim 14, wherein the gratings arranged as a stack of gratings, whose periods are set so that they diffract said three different wavelengths achromatically into as single waveguide.

* * * * *